(12) United States Patent
Nuytkens et al.

(10) Patent No.: US 6,765,950 B1
(45) Date of Patent: Jul. 20, 2004

(54) METHOD FOR SPREAD SPECTRUM COMMUNICATION OF SUPPLEMENTAL INFORMATION

(75) Inventors: Peter R. Nuytkens, Melrose, MA (US); Ahmed Mitwalli, Cambridge, MA (US)

(73) Assignee: Custom One Design, Inc., Melrose, MA (US)

( * ) Notice: Subject to any disclaimer, the term of this patent is extended or adjusted under 35 U.S.C. 154(b) by 0 days.

(21) Appl. No.: 09/283,477

(22) Filed: Apr. 1, 1999

(51) Int. Cl.[7] .............................................. H04B 1/69
(52) U.S. Cl. ...................... 375/130; 375/140; 375/147
(58) Field of Search ............................... 375/130, 131, 375/132, 139, 140, 142, 145, 147, 150; 370/342; 348/725, 726; 380/34; 709/217

(56) References Cited

U.S. PATENT DOCUMENTS

| | | | | |
|---|---|---|---|---|
| 3,648,959 A | * | 3/1972 | Wagner ...................... 206/320 |
| 3,993,861 A | | 11/1976 | Baer ........................... 178/5.6 |
| 4,425,642 A | * | 1/1984 | Moses et al. ................ 370/477 |
| 4,475,208 A | * | 10/1984 | Ricketts ........................ 380/34 |
| 4,654,700 A | | 3/1987 | Baer ........................... 358/93 |
| 4,821,120 A | * | 4/1989 | Tomlinson ................... 348/727 |
| 4,840,602 A | | 6/1989 | Rose ........................... 446/175 |
| 5,073,899 A | * | 12/1991 | Collier et al. ................ 375/135 |
| 5,191,615 A | | 3/1993 | Aldava ........................... 381/3 |
| 5,663,766 A | | 9/1997 | Sizer ........................... 348/473 |
| 5,752,880 A | | 5/1998 | Gabai et al. .................... 463/1 |
| 5,812,592 A | * | 9/1998 | Suzuki et al. ................ 375/142 |
| 5,822,360 A | | 10/1998 | Lee et al. .................... 375/200 |
| 5,864,315 A | | 1/1999 | Welles, II et al. ........... 342/357 |
| 5,923,516 A | * | 7/1999 | Young ......................... 361/111 |
| 6,009,118 A | * | 12/1999 | Tiemann et al. ............. 375/150 |
| 6,021,432 A | * | 2/2000 | Sizer, II et al. ............. 709/217 |
| 6,290,566 B1 | | 9/2001 | Gabai et al. ................. 446/175 |
| 6,330,335 B1 | | 12/2001 | Rhoads et al. .............. 380/252 |
| 6,353,413 B1 | * | 3/2002 | White et al. ................. 342/453 |
| 6,380,844 B2 | * | 4/2002 | Pelekis ........................ 340/5.8 |
| 6,389,055 B1 | * | 5/2002 | August et al. ............... 375/130 |

FOREIGN PATENT DOCUMENTS

| | | | | |
|---|---|---|---|---|
| EP | 0710022 A2 | 5/1996 | ............ H04N/7/08 |
| EP | 0868082 A2 | 9/1998 | ............ H04N/7/08 |

* cited by examiner

*Primary Examiner*—Chieh M. Fan
(74) *Attorney, Agent, or Firm*—Perkins Smith & Cohen LLP; Jacob N. Erlich; John A. Hamilton

(57) ABSTRACT

Systems and methods for the communication and recovery of supplementary data encoded in the primary information transmitted from a source to a receiver for both audio and television transmissions. The method includes modulating a carrier signal with the supplementary data using a spread spectrum approach and demodulating the carrier signal to recover the embedded supplementary data.

1 Claim, 16 Drawing Sheets

US 6,765,950 B1

METHOD FOR SPREAD SPECTRUM COMMUNICATION OF SUPPLEMENTAL INFORMATION

FIELD OF THE INVENTION

The invention relates to communications in general and to the recovery of supplemental information encoded into the primary information transmitted from a source to a receiver.

BACKGROUND OF THE INVENTION

Historically, several methods have been used to transmit embedded data along with a carrier signal, such as a radio or television signal. In one approach, data is included in parts of the signal that do not interfere with the perception of the signal by a human receiving it. One approach is to use the vertical blanking interval (VBI) in television transmissions to transmit supplementary data. In this approach, a decoder device is typically attached to the receiver to provide accurate synchronization with the incoming transmitted signal.

A spread spectrum technique is another approach used to embed supplementary data in a transmitted signal. Traditionally, analog techniques have been used to decode the supplementary data encoded using a spread spectrum technique. In general, synchronization of the local code generator with the received code can be performed with an analog correlator. Depending on the frequency used and the application requirements, the synchronization can be a time consuming operation when performed by the analog correlator. The operation involves shifting the local code and computing its correlation with the received code, and repeating this process, typically many times, until the correlation is above a threshold.

In one approach to transmitting embedded data, the embedded data is encoded using frequency shift keying of bits at a low signal level. However, mixing can occur between the data frequencies and 60 Hz sampling of a television signal, producing lower frequencies that are detectable by humans.

The present invention overcomes these shortcomings.

SUMMARY OF THE INVENTION

One object of the invention is to produce a data embedding system that does not require a decoder attached to the receiving device. Another object is to embed the data without side effects detectable by the human perceiving the transmission. A further object of the invention is to shorten the time frame required for synchronization between the received signal and a local reference signal.

The invention relates to a method for encoding a second signal within the transmission of a first signal The method includes the steps of providing the first signal, providing the second signal, modulating the second signal utilizing a spread spectrum technique to form a code modulated signal, and modulating a carrier signal with the first signal and the code modulated signal.

The invention also relates to a method for transmitting a second signal within the transmission of a first signal. The method includes the steps of providing the first signal, providing the second signal, modulating the second signal with a spread spectrum technique to form a code modulated signal, modulating a carrier signal with the first signal and the code modulated signal, transmitting the modulated carrier signal, receiving the modulated carrier signal, demodulating the carrier signal to recover the first signal and the code modulated signal, separating the first signal from the code modulated signal, and demodulating the code modulated signal to recover the second signal. The spread spectrum technique used is a direct sequence technique, a frequency hopping technique, or a hybrid technique.

In one embodiment the first signal is a television video image and the recovered first signal and code modulated signal includes the television video image and a video representation of the second signal. In this embodiment, the step of separating the first signal from the code modulated signal includes the step of removing the television image.

In another embodiment the first signal is an audio signal and the recovered first signal and code modulated signal includes the audio signal and an audio representation of the second signal.

The invention also relates to an apparatus for extracting a second signal encoded in a first video signal. The apparatus includes a first photodiode, a second photodiode and a difference amplifier having an output terminal and having a first input terminal in electrical communication with the first photodiode and a second input terminal in electrical communication with the second photodiode. The apparatus also includes a code generator utilizing a spread spectrum technique and having an input terminal and an output terminal, a multiplier having an output terminal and having a first input terminal in electrical communication with the output terminal of the difference amplifier and a second input terminal in electrical communication with the output terminal of the code generator, and an integrator having an output terminal and having an input terminal in electrical communication with the output terminal of the multiplier. The apparatus further includes a code search synchronizer having a first input terminal in electrical communication with the output terminal of the integrator, having an output terminal in electrical communication with the input terminal of the code generator, and having a second input terminal. The apparatus further includes a processor having a first input terminal in electrical communication with the output of the integrator and having a first output terminal in electrical communication with the second input terminal of the code search synchronizer.

The first photodiode is configured to view the second signal encoded in the first video signal and the second photodiode is configured to provide a dark current threshold. The spread spectrum technique is a direct sequence technique, a frequency hopping technique, or a hybrid technique.

In another embodiment, the apparatus includes an output device having an input terminal, wherein the processor has an output terminal in electrical communication with the output terminal of the output device. The output device produces an output signal in response to the second signal from the processor.

The invention also relates to a system for transmitting and extracting a second signal encoded in a first video signal. The system includes a transmission system including a video signal source providing the first video signal at a first output terminal, a second signal source providing the second signal at a first output terminal, a code generator providing a code at a first output, a code modulator having an output terminal and a first input terminal in electrical communication with the output terminal of the second signal source and having a second input terminal in electrical communications with the output terminal of the code generator, an adder having an output and a first input terminal in electrical communication with the first output terminal of the video signal source and a second input in electrical communication with the output terminal of the code modulator, and a transmitter having an input terminal in electrical communication with the output terminal of the adder. The system further includes a television receiver having a television screen and a decoder including a first photodiode, a second photodiode, and a difference amplifier having an output terminal and having a first input terminal in electrical communication with the first photodiode and a second input terminal in electrical communication with the second photodiode. The decoder also includes a code generator having an input terminal and an output terminal, a multiplier having an output terminal and having a first input terminal in electrical communications with the output terminal of the difference amplifier and a second input terminal in electrical communication with the output terminal of the code generator. The decoder also includes an integrator having an output terminal and having an input terminal in electrical communication with the output terminal of the multiplier, a code search synchronizer having a first input terminal in electrical communication with the output terminal of the integrator, having an output terminal in electrical communication with the input terminal of the code generator and having a second input terminal, and having a processor having a first input terminal in electrical communication with the output of the integrator and having a first output terminal in electrical communication with the second input terminal of the code search synchronizer. The first photodiode is configured to view the television screen and at least one of the code generator and the code modulator utilizes a spread spectrum technique including a direct sequence technique, a frequency hopping technique, or a hybrid technique.

The invention also relates to an apparatus for extracting a second signal encoded in a first audio signal including a first audiodetector, an audio amplifier, an analog automatic gain control, a power detection circuit, a code generator, a multiplier, an integrator, a code search synchronizer, and a processor. The audio amplifier includes a first input terminal in electrical communication with said first audiodetector and an output terminal. The analog automatic gain control includes an input terminal in electrical communication with the output terminal of the audio amplifier, an output terminal and a gain control terminal. The power detection circuit includes an input terminal in electrical communication with the output terminal of the audio amplifier and an output terminal in electrical communication with the gain control terminal of the automatic gain control circuit. The code generator includes an input terminal and an output terminal and utilizes a spread spectrum technique. The multiplier includes a first input terminal in electrical communications with the output terminal of the automatic gain control circuit, a second input terminal in electrical communication with the output terminal of the code generator, and an output terminal, The integrator includes an input terminal in electrical communication with the output terminal of the multiplier and an output terminal. The code search synchronizer includes a first input terminal in electrical communication with the output terminal of the integrator, an output terminal in electrical communication with the input terminal of the code generator and a second input terminal. The processor includes a first input terminal in electrical communication with the output of the integrator and a first output terminal in electrical communication with the second input terminal of the code search synchronizer.

The invention also relates to a system for transmitting and extracting a second signal encoded in a first audio signal including a transmission system, an audioreceiver, and a decoder. The transmission system includes a audio signal source, a second signal source, a code generator, a code modulator, an adder, and a transmitter. The audio signal source provides the first audio signal at a first output terminal. The second signal source provides the second signal at a first output terminal. The code generator provides a code at a first output. The code modulator includes an output terminal and a first input terminal in electrical communication with the output terminal of the second signal source and a second input terminal in electrical communication with the output terminal of the code generator. The adder includes an output and a first input terminal in electrical communication with the first output terminal of the audio signal source and a second input in electrical communication with the output terminal of the code modulator. The transmitter includes an input terminal in electrical communication with the output terminal of the adder. The audioreceiver includes a sound generator. The decoder includes a first audiodetector, an audio amplifier, an analog automatic gain control, a power detection circuit, a code generator, a multiplier, an integrator, a code search synchronizer, and a processor. The audio amplifier includes a first input terminal in electrical communication with the first audiodetector and an output terminal The analog automatic gain control includes an input terminal in electrical communication with the output terminal of the audio amplifier, an output terminal and a gain control terminal. The power detection circuit includes an input terminal in electrical communication with the output terminal of the audio amplifier and an output terminal in electrical communication with the gain control terminal of the automatic gain control circuit. The code generator includes an input terminal and an output terminal, and utilizes a spread spectrum technique. The multiplier includes a first input terminal in electrical communication with the output terminal of the automatic gain control circuit, a second input terminal in electrical communication with the output terminal of the code generator and an output terminal. The integrator includes an input terminal in electrical communication with the output terminal of the multiplier and an output terminal. The code search synchronizer includes a first input terminal in electrical communication with the output terminal of the integrator, an output terminal in electrical communication with the input terminal of the code generator and a second input terminal. The processor includes a first input terminal in electrical communication with the output of the integrator and a first output terminal in electrical communication with the second input terminal of the code search synchronizer. The first audiodetector is configured to hear sound generated by the sound generator. The code generator and/or the code modulator utilizes a spread spectrum technique.

The invention also relates to a method for synchronizing a reference code signal with a received signal comprising an embedded code. The method includes reversing the order of bits in the reference code signal to produce a reversed code signal, performing a transform on the reversed code signal to produce a transformed reversed code signal, performing the transform on the received signal to produce a transformed received signal, processing the transformed reversed code signal and the transformed received signal to produce an intermediate signal, performing an inverse of the transform on the intermediate signal to produce a correlation signal, determining a peak value in the correlation signal, determining a wait value from the peak value and a time period to wait based on the wait value, and waiting for the time period to synchronize the embedded code in the received signal with the reference code signal.

In a further embodiment, the invention relates to a method for synchronizing a reference code signal with a received signal comprising an embedded code using a sampling approach. The method includes the steps of sampling the received signal to produce a sample signal, storing the sample in a memory, shifting the reference code by a predetermined increment to produce a shifted reference code, retrieving the sample signal from the memory, and multiplying the shifted reference code and the sample signal to produce an intermediate signal. The method further includes accumulating the intermediate signal, accumulating a plurality of intermediate signals, determining a peak value for the sample signal from the accumulated results, determining a wait value from the peak value, determining a time period from the wait value, and waiting for the time period while receiving the received signal to synchronize the embedded code in the received signal with the reference code signal.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
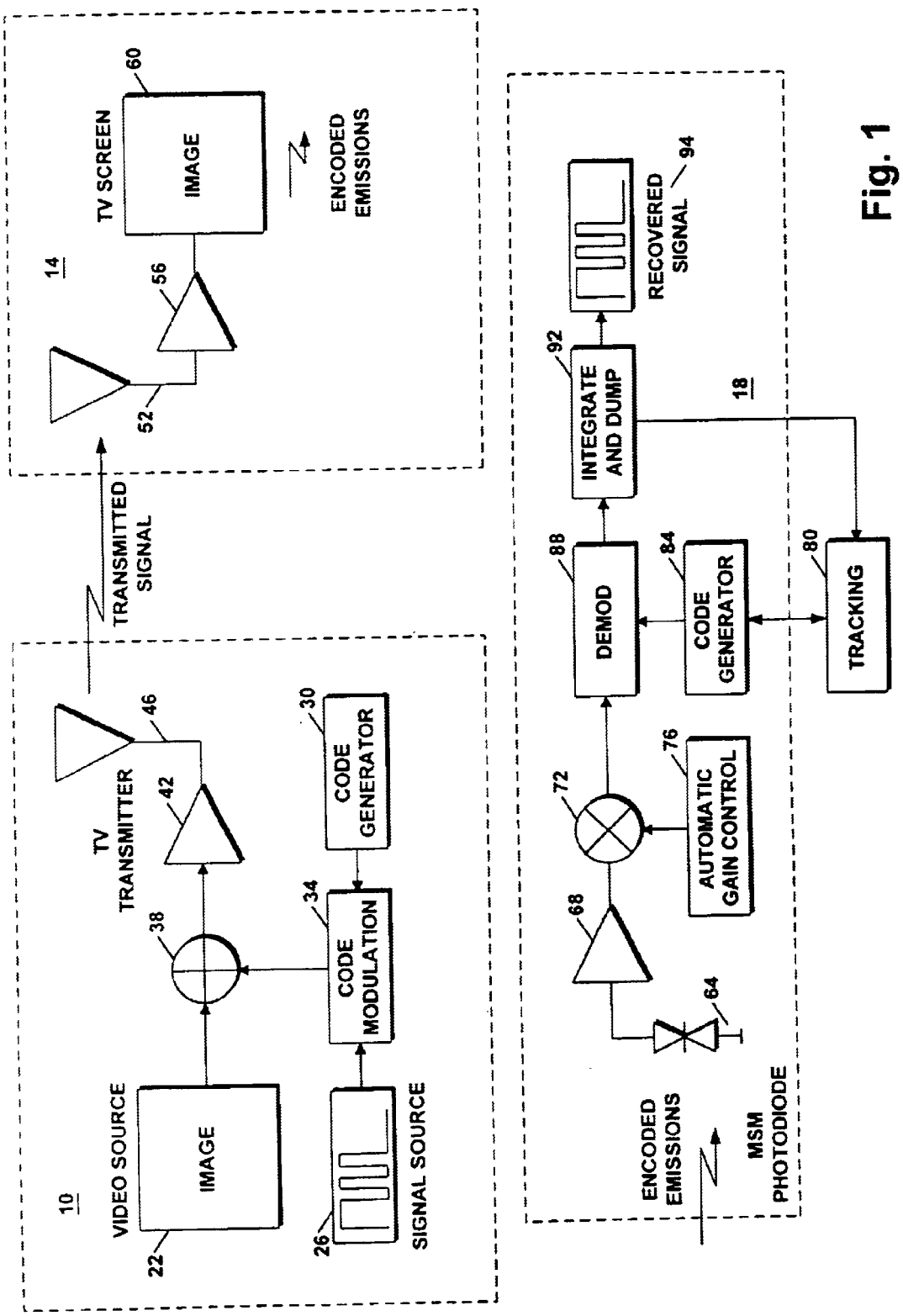
FIG. 1 is a block diagram of an embodiment of a video system constructed in accordance with the invention.

In brief overview and referring to FIG. 1, a video system constructed in accordance with the teaching of the invention includes a transmitter portion 10, a receiver portion 14 and a decoder portion 18. The transmitter portion 10 includes a video source 22 and the source of the signal to be encoded 26. The video source 22 in one embodiment is a video camera. The signal source 26 is any source of any signal to be encoded such as, but not limited to, a digital processor. The signal to be encoded may include any signal destined for the decoder portion 18 and may include, but is not limited to, signals verifying that the receiver portion 14 was on and tuned to the desired channel at a predetermined time and signals providing instructions permitting interactive activity between the decoder portion 18, for example as embodied in a toy and the video signal received by the receiver portion 14, for example a childrens' television program.

The transmitter portion 10 also includes a code generator 30 which produces a coded signal based upon a spread spectrum technique. The spread spectrum technique is based on a direct sequence code, a frequency hopping technique, or a hybrid approach of the direct sequence and frequency hopping techniques. The code produced by the code generator 30 is one input to a code modulator 34. The other input to the code modulator 34 is the output of the signal source 26. The output of the code modulator 34 is one input to an adder 38 whose other input is the output of the video source 22. The output of the adder 38 is the input to a video transmitter 42 whose output is transmitted by antenna 46 or other appropriate means such as, but not limited to, cable.

The receiver portion 14 is a standard video receiver which includes a reception device such as an antenna 52, a receiver 56 and a video display 60. The receiver 14 is any standard receiver capable of receiving the signals transmitted by the transmitter portion 10 and displaying the images received.

The decoder portion 18 is positioned to view the image produced on the video screen 60. The decoder portion 18 includes a photodiode 64 whose output is the input to a first transimpedance amplifier 68. The output signal from the amplifier 68 is one input signal to a multiplier 72. The other input signal to the multiplier 72 is the output from an automatic gain controller 76. The output signal from the multiplier 72 is one input signal to a demodulator 88. The other input of the demodulator is received from a code generator circuit 84 which generates the same spread spectrum code used by the code generator 30 of the transmitter portion 10. The output signal from the demodulator 88 is input to an integrate-and-dump circuit 92, which extracts a recovered signal 94 (corresponding to the signal produced by the signal source 26) from the image displayed on the video screen 60 of the receiver portion 14. The output of the integrate-and-dump circuit is also supplied to one input of a tracking, or synchronizing, circuit 80. The tracking circuit receives information from the code generator about the timing of the spread spectrum code being supplied by the generator to the demodulator, and responds to values of the integrate-and-dump circuit by supplying a signal to the code generator causing it to shift the timing of that spread spectrum code, if necessary.

Figure 2:
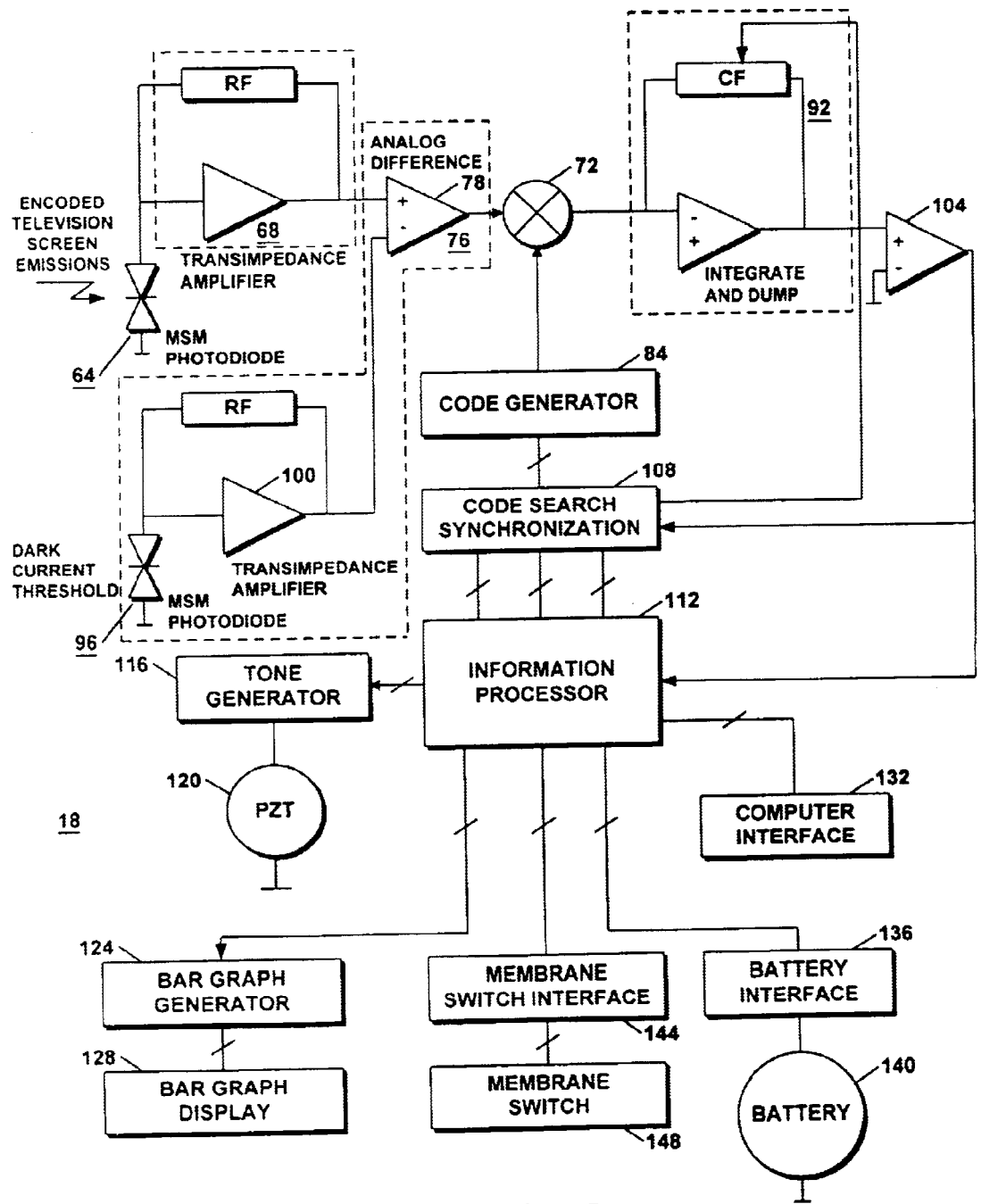
FIG. 2 is a block diagram of an embodiment of the decoder portion of the invention shown in FIG. 1.

Referring to FIG. 2, one embodiment of the decoder portion 18 includes two metal semi-conductor metal (MSM) photodiodes 64, 96 which provide a planar, inexpensively manufactured device The output signal from the first photodiode 64 is the input signal to the first transimpedance amplifier 68. In one embodiment, the first transimpedance amplifier 68 has a trans-resistance of 10 K to 100 K and a bandwidth greater than 10 GHz. This photodiode 64 is positioned to view the video screen 60.

The automatic gain controller 76 includes the second MSM photodiode 96, the second transimpedance amplifier 100, and the analog difference amplifier 78. The second MSM photodiode 96 is positioned to measure background illumination and its output signal is the input signal to the second transimpedance amplifier 100. In one embodiment, the second photodiode 96 is directed at an angle to the first photodiode 64 so that the second photodiode 96 does not receive light directly from the video screen 60. The second photodiode 96 measures the background light in the room to obtain a measurement of background ambient light or "noise."

In another embodiment, the second photodiode 96 is not exposed to light. In this embodiment, the second photodiode 96 produces a low level intrinsic dark current. The intrinsic dark current of the second photodiode 96 is used as a background or base-level current to compare to the output of the first photodiode 64.

The output signals from the first transimpedance amplifier 68 and the second transimpedance amplifier 100 are the input signals to an analog difference amplifier 78. The output signal from the difference amplifier 78 is therefore the signal which results from the viewing of the video screen 60.

The output of the difference amplifier 78 is one input signal to a multiplier 72. The other input signal to the multiplier 72 is the output signal from the code generator 84. In one embodiment, the code generator 84 is an ASIC (application specific integrated circuit), while in other embodiments the generator 84 is a programmable microprocessor or a processor fabricated using discrete components, such as shift registers. The output signal from the multiplier 72 is one input signal to the integrate-and-dump circuit 92, which in this embodiment is depicted as an integrator. The output signal from the integrate-and-dump circuit 92 is the input signal to an amplifier 104 whose output signal is the input signal for a code search synchronization (search and tracking) module 108 and the input signal to an information processor 112. The output signal of the search and tracking module 108 is an input signal to the code generator 84.

The output of amplifier 104 often in the form of binary levels, is used by the information processor 112 to form digital words or instructions. The actions and nature of the data is different depending on the specific application.

The operation of the decoder shown in FIG. 2 involves a combination of correlation and comparison. The correlation multiplies the signal by the code and integrates the result over a time corresponding to one bit of the encoded signal. The comparison determines if the output of the integrator has a high or a low level, and if the level is high the recovered bit is treated as a logical one, and, if it is low, the recovered bit is treated as a logical zero.

For example, the output of the information processor 112 may be used to control a tone generator 116 which in turn drives a piezoelectric transducer or buzzer 120 to produce an audible output, or to control a bar graph generator 124 which is used to drive a bar graph display 128. The processor in addition includes a computer interface 132 for communicating with another computer, a battery interface 136 to control power from a battery 140, and a membrane switch interface 144 to accept input from a membrane switch 148.

Figure 21:
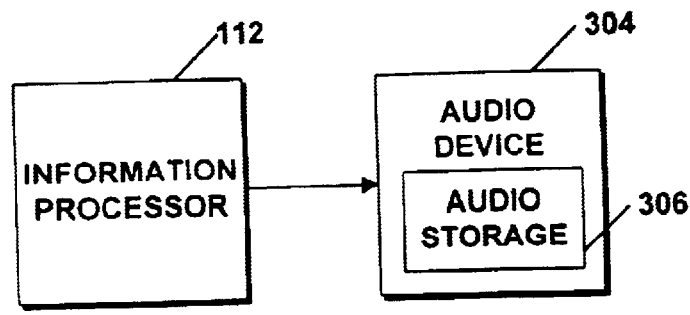
FIG. 21 is a block diagram of an output device that is an audio device having an audio storage connected to such an information processor.

In general, the output of the information processor 112 may be used to control an output device in response to the supplementary data signal that is received by the information processor 112 through either a television visual transmission or radio audio transmission. In one embodiment, the information processor 112 processes or interprets the data in the supplementary data signal to produce a control or output signal which is output from the information processor 112 to the output device. The output device in turn responds to the output signal and produces an effect, such as an audio effect. As described above, the output device may be a bar graph generator 124 or a tone generator 116. In another embodiment, the output device may be any sort of suitable audio generating device that generates an audio output signal in response to the control signal of the information processor 112 and then produces an audio effect from an audio output device. The audio device may be a buzzer 120 as described above or an audio speaker. In one embodiment, a memory or audio storage device is associated with the audio output device, such as a digital storage device, a CD disk, an audio tape, or other storage device suitable for storing audio signals in either digital or analog format. This is represented schematically in FIG. 21 in which an audio device 304 is shown with audio storage 306. The output signal from the information processor 112 serves as a command or control to invoke an audio output from the audio storage device. For example, in one embodiment, the output signal invokes a musical selection stored in an audio storage device, which is then played through the speaker.

In another embodiment, the output signal provides an electronic coupon to the output device, which is then stored in the output device. In one embodiment, a individual (or redeemer) of the coupon physically carries the output device is to an external location, such as a store, where the electronic coupon may be redeemed or exchanged for monetary value, a consumer product, or some other exchange beneficial to the individual or redeemer who has the output device containing the electronic coupon.

Figure 14:
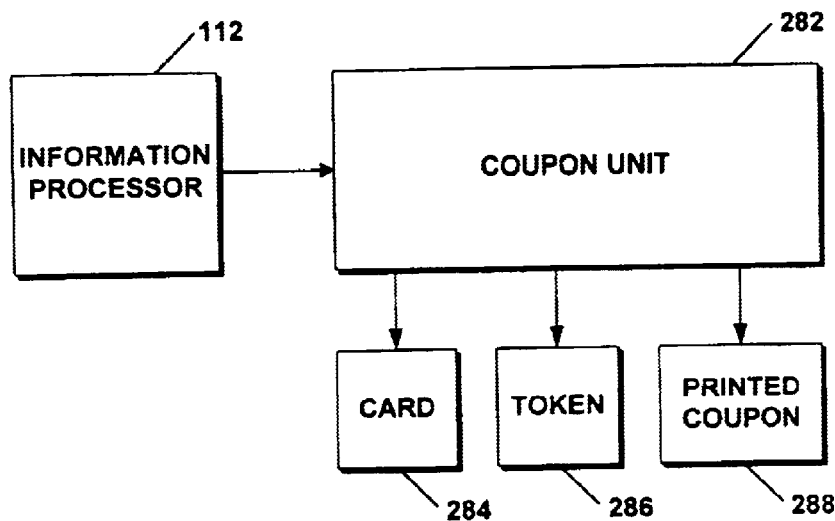
FIG. 14 is a block diagram of an output device that is a coupon unit which can output coupons in the form or either cards, tokens, or printed coupons, which is connected to an information processor of a decoder of the type shown in FIG. 2,4,5, or 6.
Figure 15:
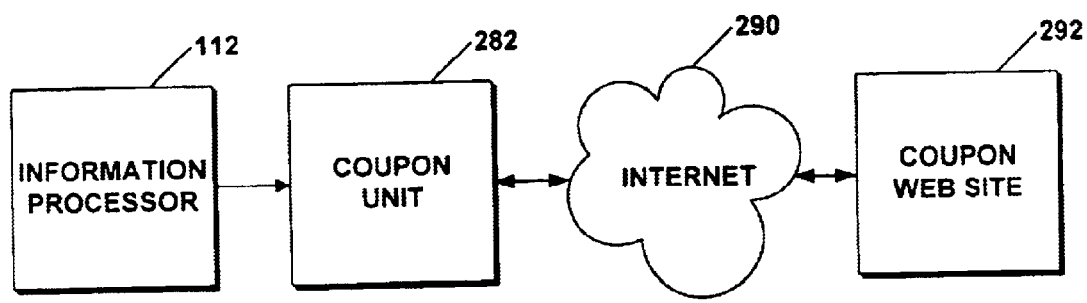
FIG. 15 is a block diagram of an output device that is coupon, unit connected to such an information processor, that can communicate over the Internet in a Coupon Web site.

In another embodiment, the output device outputs the coupon data to an output card, token, or printed coupon. The output card may be a plastic or as is indicated in FIG. 14 by the coupon unit 282 which can output either a card 284, token 286, or a printed coupon 288 cardboard card with an electromagnetic material suitable for storing the coupon data in a magnetic data storage format. The redeemer then takes the card to a store or other location to be redeemed. The output card may be a reusable or disposable card. In another embodiment, the redeemer electronically transfers the coupon data to a site, such as, but not limited to, an Internet Web site where the redeemer of the coupon exchanges the electronic coupon for some value, benefit, or credit. This is illustrated in FIG. 15 where the coupon unit 282A communicates over the Internet 290 with a coup on web site 292.

Figure 11:
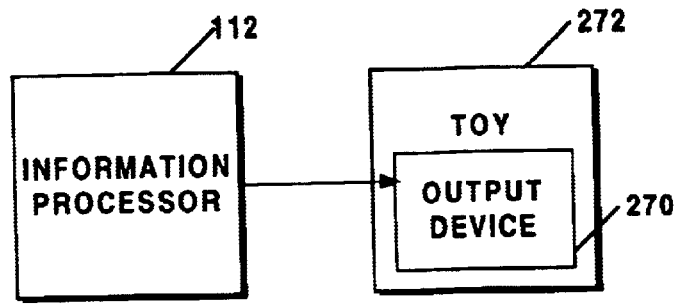
FIG. 11 is a block diagram of an output device in a toy connected to an information processor of a decoder of the type shown in FIG. 2,4,5, or 6.

In another embodiment, the output device is included as part of a toy, as is indicated by the output device 270 and toy 272 shown in FIG. 11. The output device produces an effect from the toy, such as an audio, visual, movement, or other effect. For example, an audio effect may be produced from the toy's mouth based on a control signal derived from the supplementary data signal. In another embodiment, the toy includes an output device that controls lights or other visual effects that can be invoked by the output signal, such as turning on the flashing lights on a toy fire truck. In a further embodiment, the toy includes motors or other movement devices that are controlled by the output device in response to the control signal. In other embodiments, other effects may be produced that are commonly provided by toys.

Figure 12:
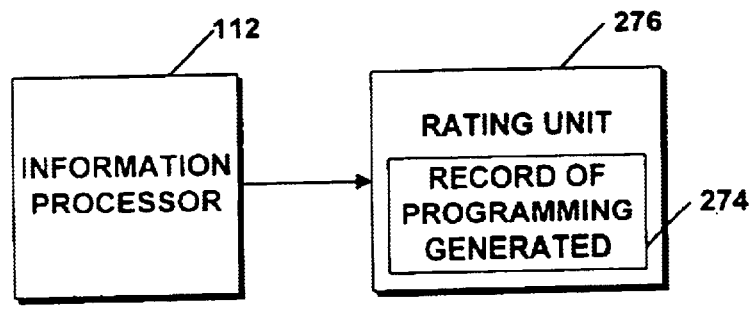
FIG. 12 is a block diagram of an output device that is a rating unit connected to such an information processor.
Figure 13:
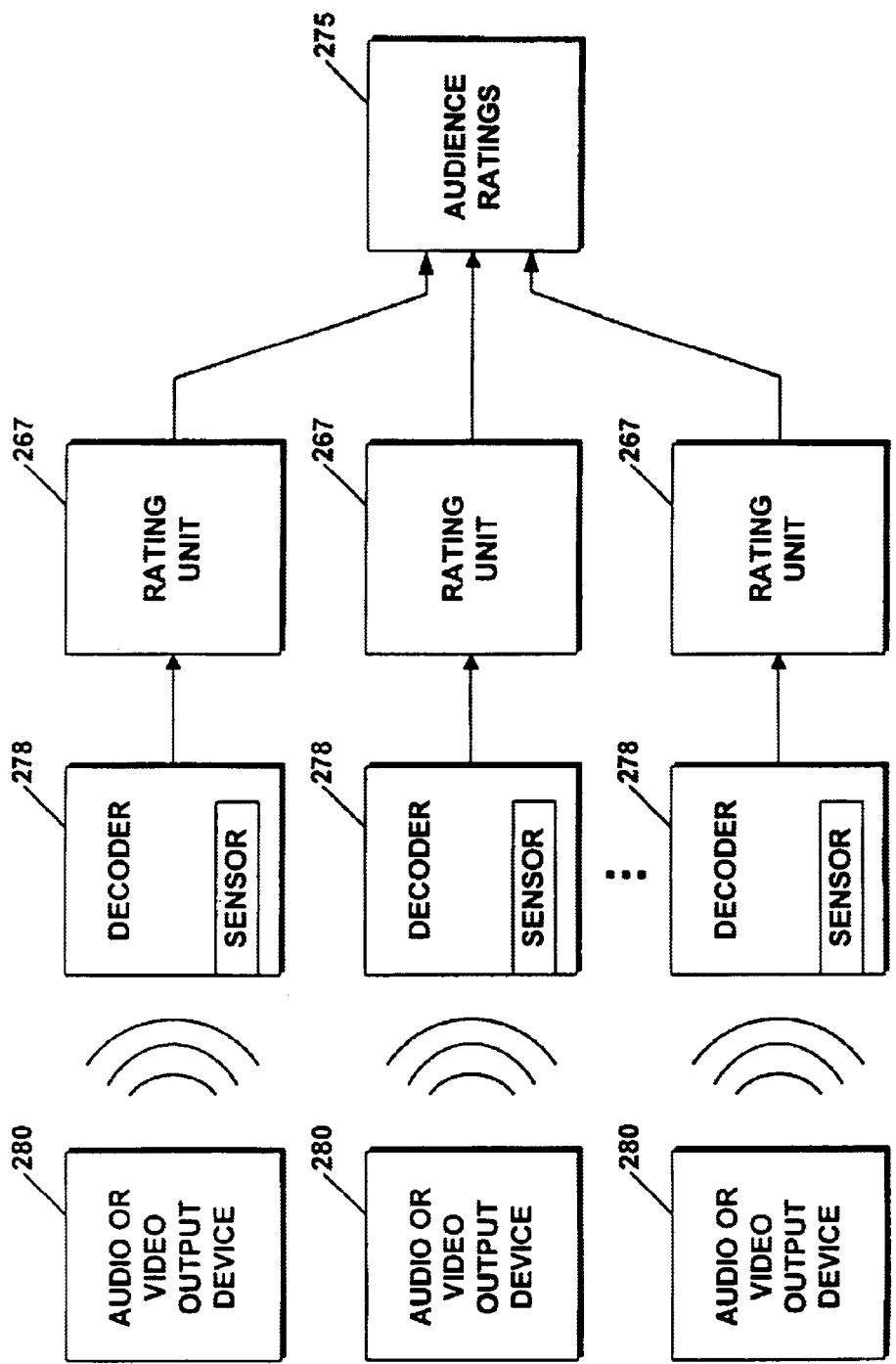
FIG. 13 is a block diagram a plurality of decoders and rating units of the type shown in FIG. 12 used for creating program ratings.

In another embodiment, the output device is a viewer preference or ratings device that determines what TV or radio shows or material that a viewer is watching, as is indicated by the output device 274 and rating unit 276 shown in FIG. 12. The ratings device stores this information and thus builds a record of what the viewer preference is for the television or radio being monitored by the ratings device. The ratings device does not need to be physically attached to the television or radio. The ratings device does not need to be placed in any particular position as long as the decoder portion, such as television decoder 18, is placed in a position where it can receive the encoded emissions from the television or radio, and the decoder portion is in electrical communication with the ratings device. FIG. 13 illustrates that ratings 275 for program can be determined by gathering the output of a plurality of decoders 278 and associated rating units 276, each of which monitors the output of an audio or video output device 280 such as a radio or TV.

Figure 16:
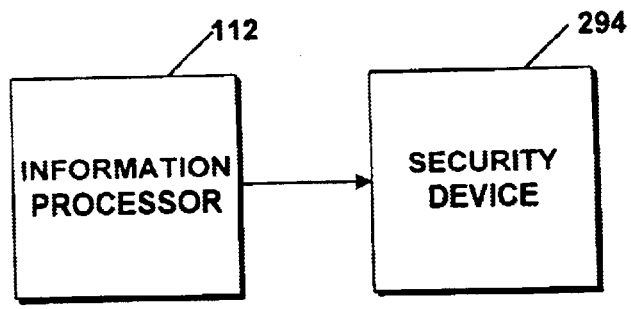
FIG. 16 is a block diagram of an output device that is a security device connected to the information processor of FIG. 2,4,5, or 6.
Figure 17:
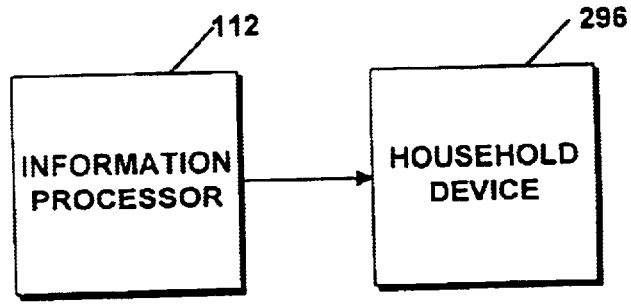
FIG. 17 is a block diagram of an output device that is a household device connected to such an information processor.
Figure 18:
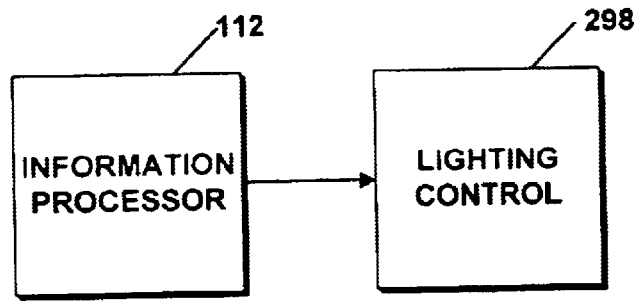
FIG. 18 is a block diagram of an output device that is a lighting control connected to such an information processor.
Figure 19:
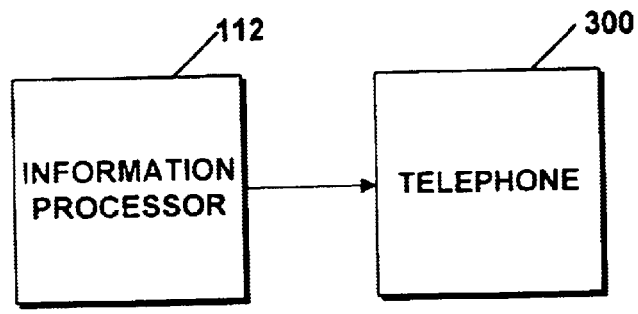
FIG. 19 is a block diagram of an output device that is a telephone connected to such an information processor.
Figure 20:
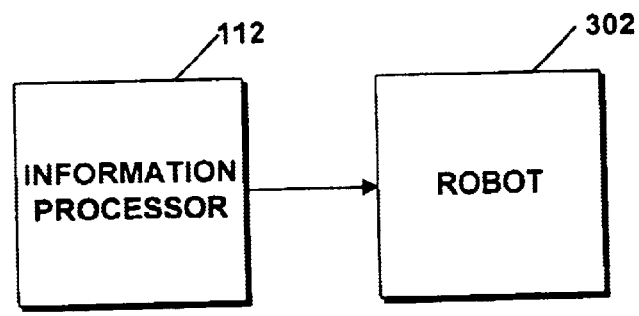
FIG. 20 is a block diagram of an output device that is a robot connected to such an information processor.

In further embodiments, the output device may be any other device that may be electronically controlled by an output signal received from the information processor 112. Such devices may include computers, as indicated by the computer interface 132 of FIGS. 2, 4, 5, and 6; security devices, as such as the security device 294 of FIG. 16; household appliances, such as the household device 296 of FIG. 17; lighting control devices, such as the lighting control 298 of FIG. 18; telephones, such as the telephone 300 of FIG. 19; robots, such as the robot 302 of FIG. 20; and other devices subject to electronic control.

Referring to FIGS. 3a–e, in operation the video source 22 (FIG. 1) produces a signal that contains the information necessary to reproduce an image (FIG. 3a), that for the purpose of discussion will be considered noise-free. The signal source 26 produces a signal to be encoded and that signal is encoded by a code generator 30 using a spread spectrum technique The encoded signal is combined with the video image signal in an adder and the resulting signal transmitted.

Figure 3A:
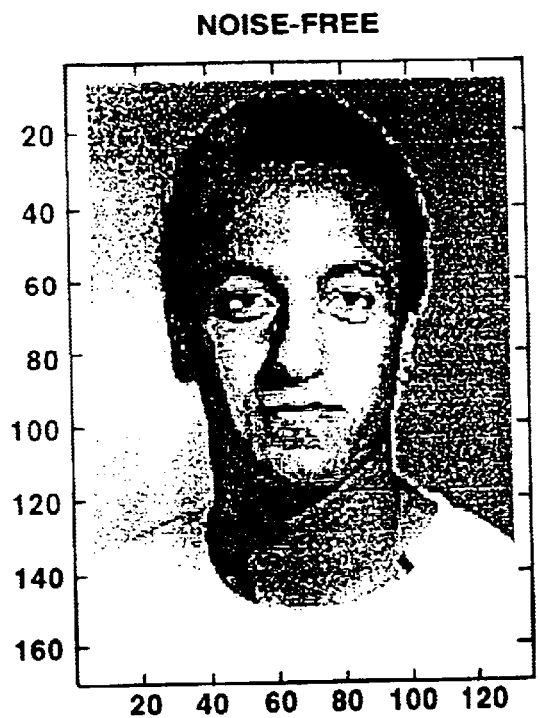
FIGS. 3a–e are examples of signals generated and recovered by the embodiment of the invention shown in FIG. 1 with varying signal to noise ratios.
Figure 3B:
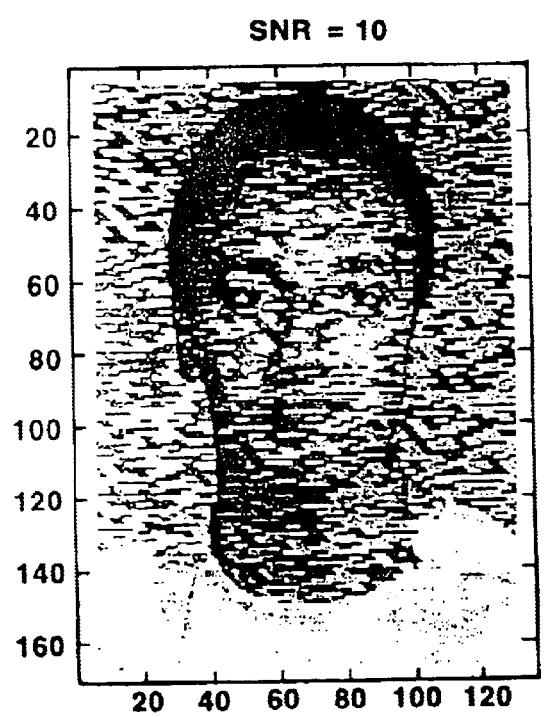
Figure 3C:
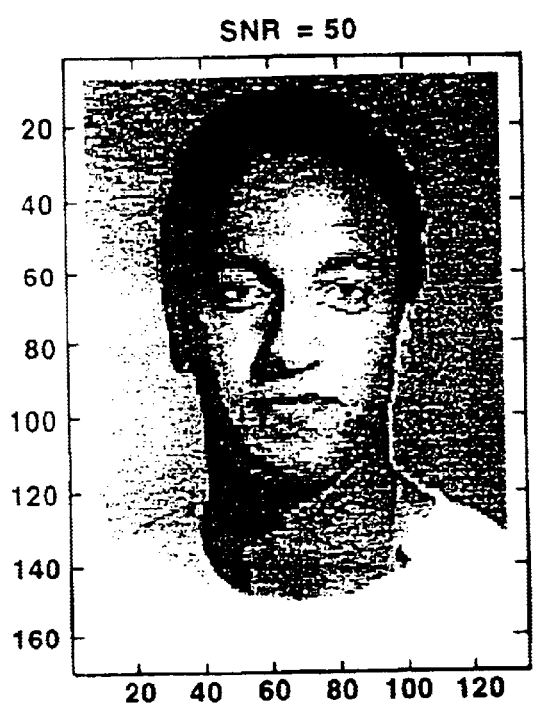
Figure 3D:
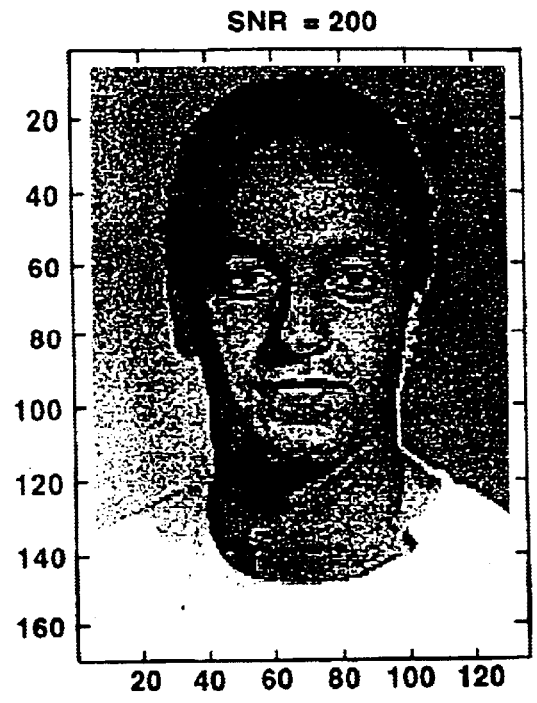
Figure 3E:
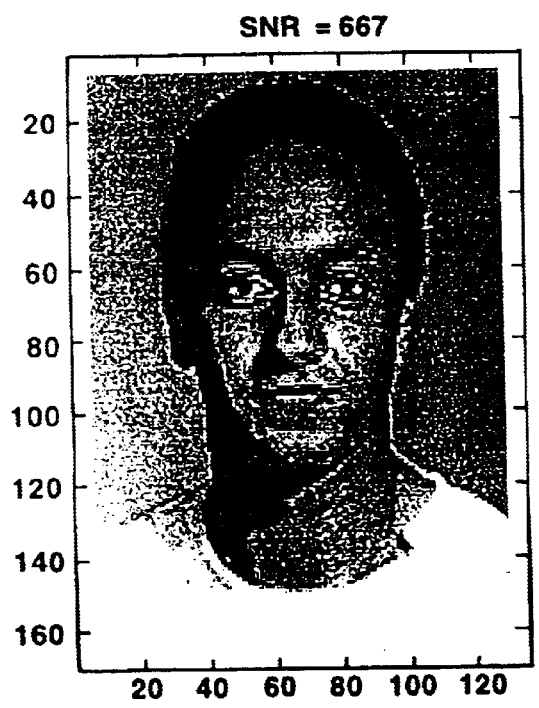

The receiver portion 14 of the system displays the received composite of video image signal and encoded signal on the video display 60. The encoded signal appears as noise in the received video image signal. This appears as a random gray pattern, sometimes referred to as "snow", displayed in the image (FIG. 3b). This encoded signal is apparent in this FIG. 3b because the signal to noise ratio (SNR), which is video image signal/encoded signal ratio, is 10. If however the SNR is increased to 50, the gray pattern of the encoded signal is less noticeable (FIG. 3c). If the SNR is increased to 200, the gray pattern of the encoded signal is barely noticeable or not noticeable to the human eye (FIG. 3d). When the SNR is increased to 667 (FIG. 3e), the composite video image appears the same to the naked eye as the original or noise free image (FIG. 3a). In other embodiments, other values than 667 for the SNR may be used to produce an image that appears to the naked eye to be noise free.

However, although the signal encoded in the video image data is substantially invisible to the eye, the decoder portion 18 of the system views both the encoded signal and the video image and is able to discriminate the encoded signal from the video image signal. The encoded signal is then decoded using the same spread spectrum technique as was used to encode the information.

Figure 4:
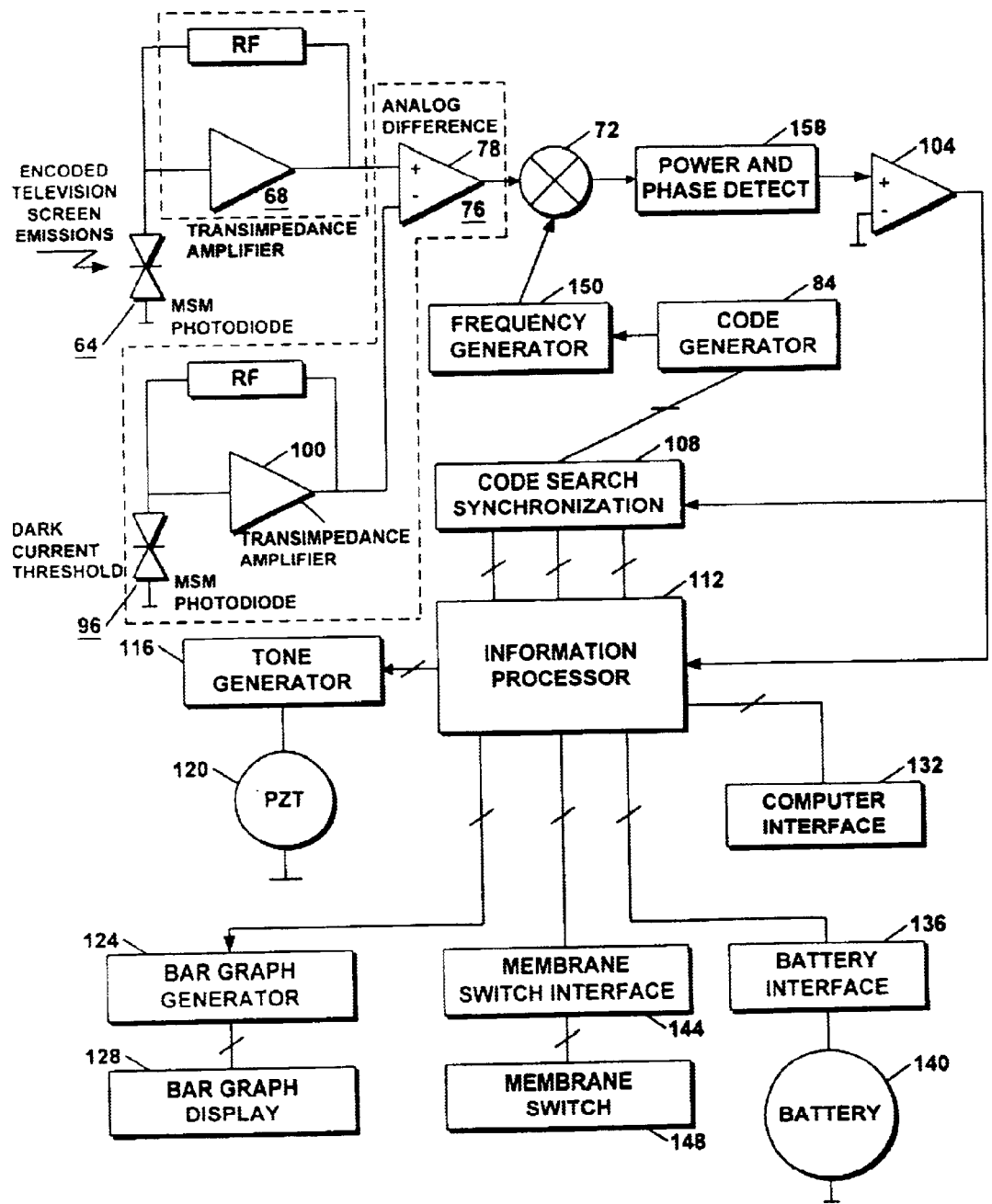
FIG. 4 is a block diagram of another embodiment of the decoder portion of a video system constructed in accordance with the invention.

FIG. 4 depicts another embodiment of the invention which utilizes frequency hopping. As described previously with respect to FIG. 2, the video signal and dark current threshold signal are received by photodetectors 64 and 96 respectively, amplified by transimpedance amplifiers 68 and 100 respectively and subtracted using a difference amplifier 78. The resulting signal is one input signal to a multiplier 72 which has the output signal of a frequency generator 150 as the second input signal. The output signal of the multiplier 72 is the input signal to a power and phase detect circuit 158. In one embodiment, the power and phase detect circuit 158 is an automatic gain circuit with a 60 dB range.

The output signal from the power and phase detect circuit 158 is the input signal to an amplifier 104 as in the previous embodiment. As in the previous embodiment the output signal of the amplifier 104 is an input signal to a code search synchronization circuit 108 and the output signal from the code search synchronization circuit 108 is the input to a code generator 84. In this embodiment however, the output signal from the code generator 84 is used as the input signal to the frequency generator 150 rather than the input signal to the multiplier 72. In one embodiment, the frequency generator 150 is implemented as a table mechanism. The direct sequence code is used to determine the frequency corresponding to the code by using a lookup table.

Figure 10:
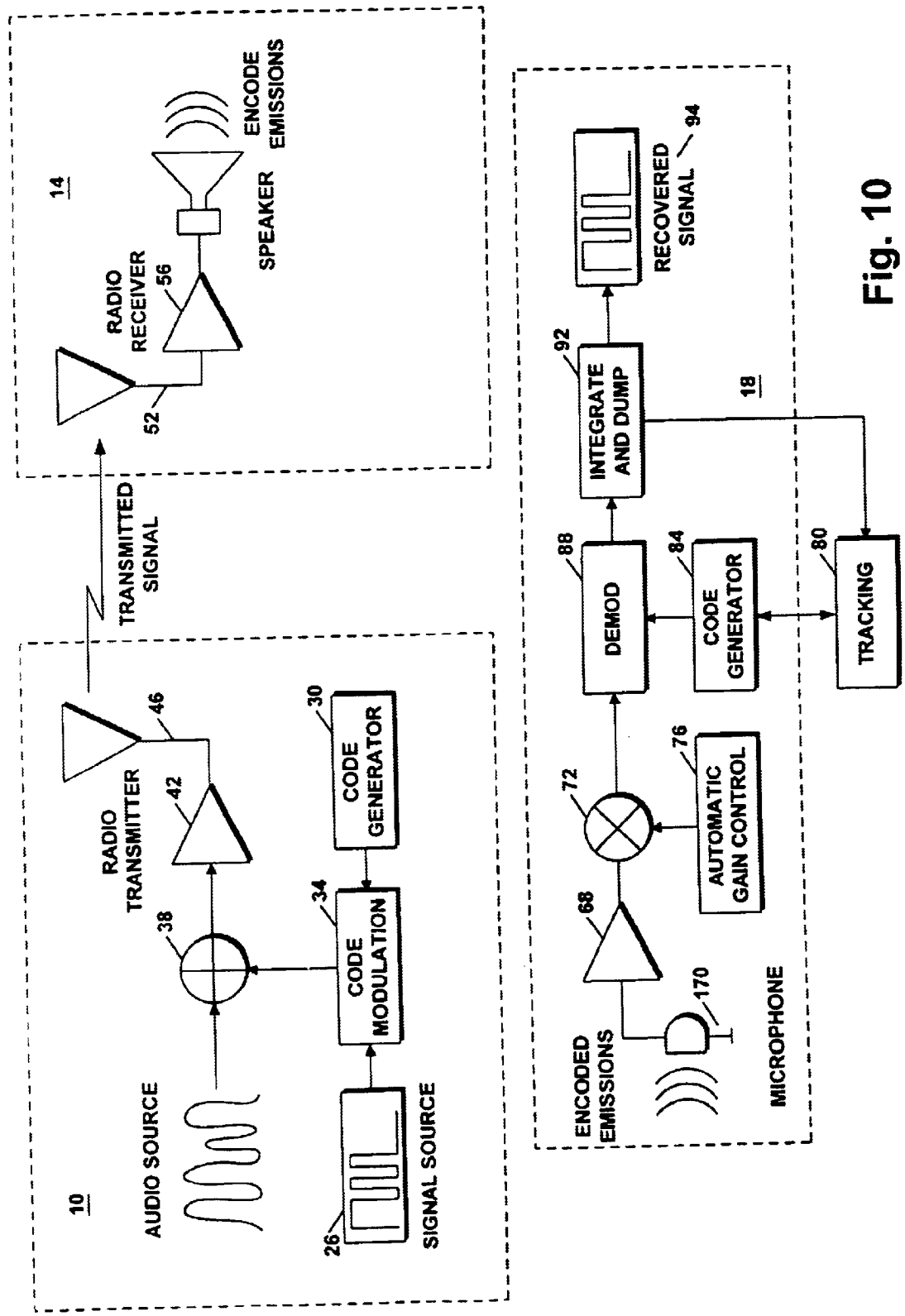
FIG. 10 is a block diagram, similar to FIG. 1, of an embodiment of an audio system constructed in accordance with the invention.

Referring to FIG. 10 an embodiment of an audio system constructed in accordance with the invention is shown. The transmitter 10A, receiver 14A, and decoder 18A of FIG. 10 are similar to the transmitter 10, receiver 14, and decoder 18 of the video embodiment shown in FIG. 1, except that in them the video signal 22 has been replaced with an audio signal 22A, the video transmitter 42 has been replaced with an audio transmitter 42A, the TV receiver 56 has been replaced with a radio receiver 56A, the TV screen 60 has been replaced with a speaker 60A; the encoded emissions represented as light rays in FIG. 1 have been replaced with encoded emissions represented as sound waves, and the photodiode 64 has been replaced with a microphone 170.

Figure 5:
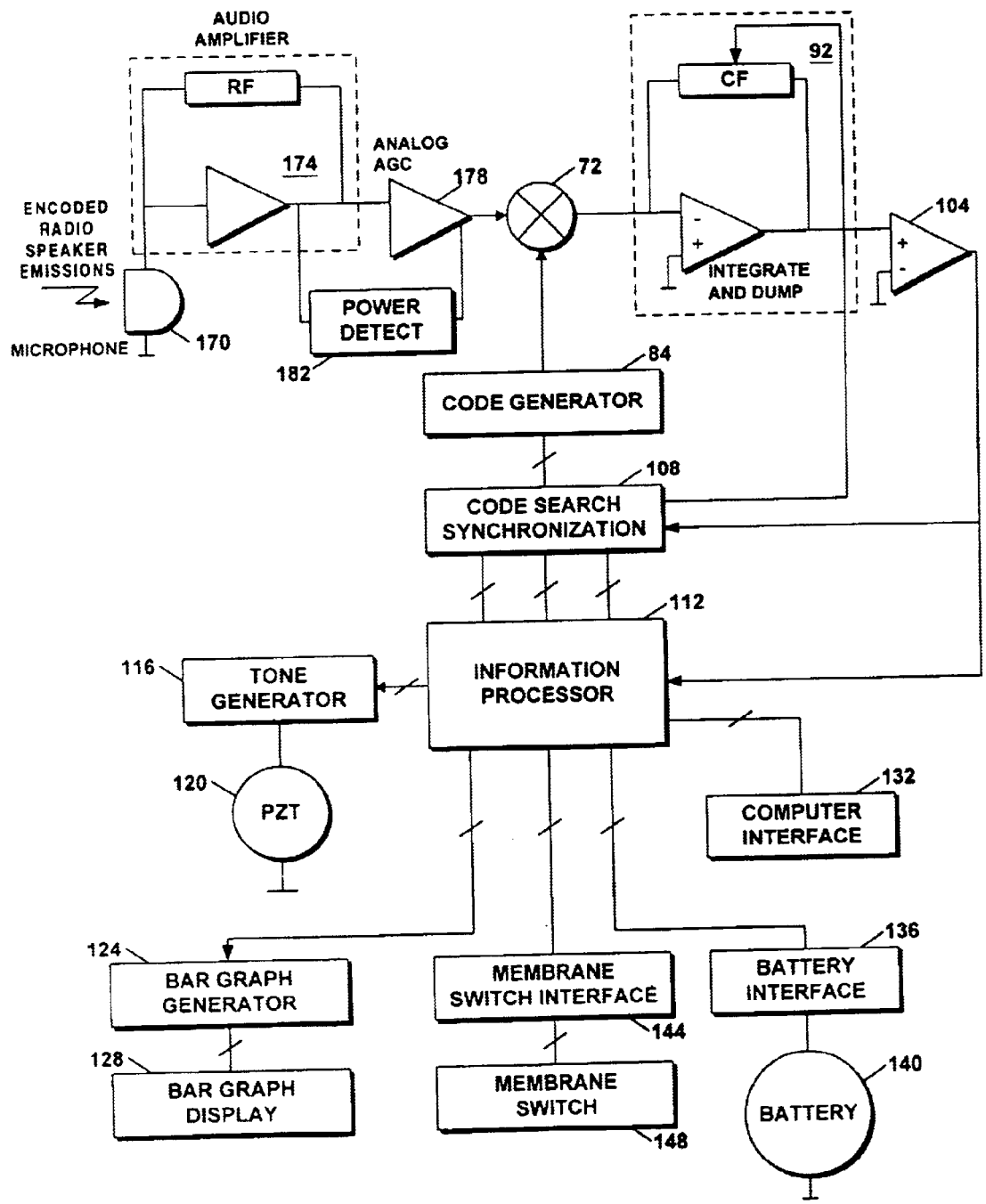
FIG. 5 is a block diagram of an embodiment of a decoder portion of an audio system constructed in accordance with the invention.
Figure 6:
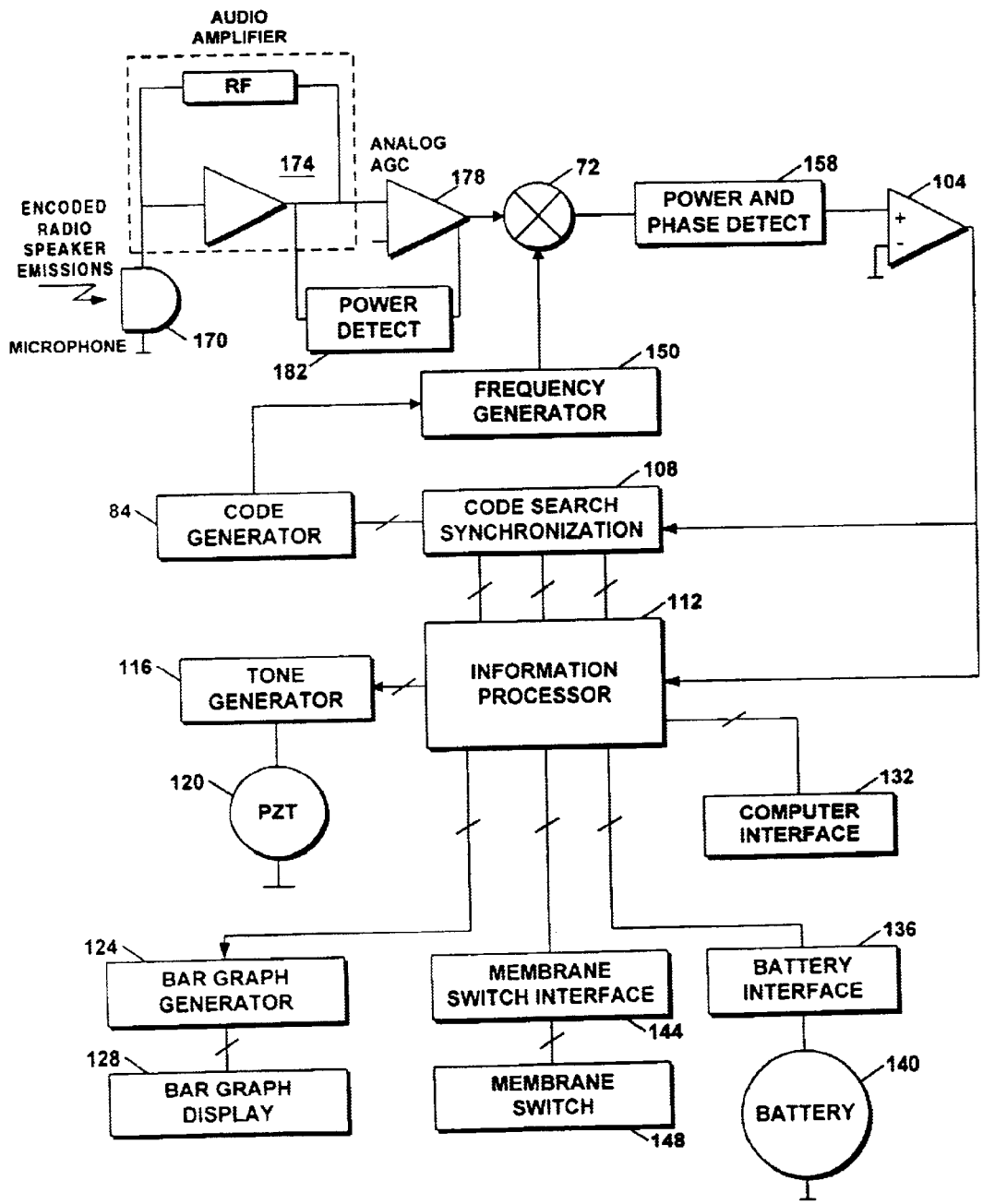
FIG. 6 is a block diagram of another embodiment of a decoder portion of an audio system constructed in accordance with the invention.

Two different embodiments of the decoder 18A of FIG. 10 are shown, one in FIG. 5 and one in FIG. 6. In the embodiment of FIG. 5 a microphone 170 receives encoded audio emissions and produces a signal which is an input signal to an audio amplifier 174. The microphone 170 is also used to measure an overall power level for the audio signal in the room where the audio emissions are being received. The amplified signal from the audio amplifier 174 is the input signal to an analog automatic gain control circuit 178 and an input signal to a power detection circuit 182 The output signal from the power detection circuit 182 is the control signal for the automatic gain control circuit 178. The automatic gain control circuit 178 responds to the overall power level of the audio signal as detected by the microphone 170 and processed by the power detection circuit 182. If necessary, the automatic gain control circuit 178 adjusts the power level appropriately, either by decreasing or increasing the signal being received by the automatic gain control circuit 178. For example, if the overall power level of the audio signal is high, the power detection circuit 182 detects a high power level and provides a control signal to the automatic gain control circuit 178 that results in a decrease in the signal produced as output from the automatic gain control circuit 178. Thus, the automatic gain control circuit 178 adjusts for the microphone 170 being close or far away from the audio emissions.

Any background or ambient noise received by the microphone 170 is eliminated in the processing of the signal to synchronize and extract the supplementary data. The synchronization and correlation process extracts the supplementary data and treats any other data in the audio signal as noise and ignores it when extracting the supplementary data.

The remainder of the circuit is identical to the circuit described in FIG. 2. Thus the difference between the audio and video embodiments lies primarily in the input signal being audio rather than video, which thus affects the input and signal conditioning circuitry.

Referring to FIG. 6, an embodiment of an audio system using frequency hopping constructed in accordance with the invention is shown. Again, as described with respect to FIG. 5, audio signals are detected by microphone 170 and the output signal from the microphone 170 is the input signal to an audio amplifier 174. Again the output signal from the audio amplifier 174 is the input signal to an automatic gain control circuit 178 and the input signal to a power detection circuit 182. The output signal from the power detection circuit 182 is used to control the gain of the automatic gain control circuit 178. The output signal of the automatic gain control 178 is one input signal to a multiplier 72. As described with respect to frequency hopping video system of FIG. 4, the other input signal to the multiplier 72 is the output signal of a frequency generator 150. The output signal of the multiplier 72 is the input signal to a power and phase detection circuit 158 also as described with respect to FIG. 4. The remainder of the frequency hopping audio system is identical to the that described above with respect to the frequency hopping video circuit of FIG. 4.

Figure 7:
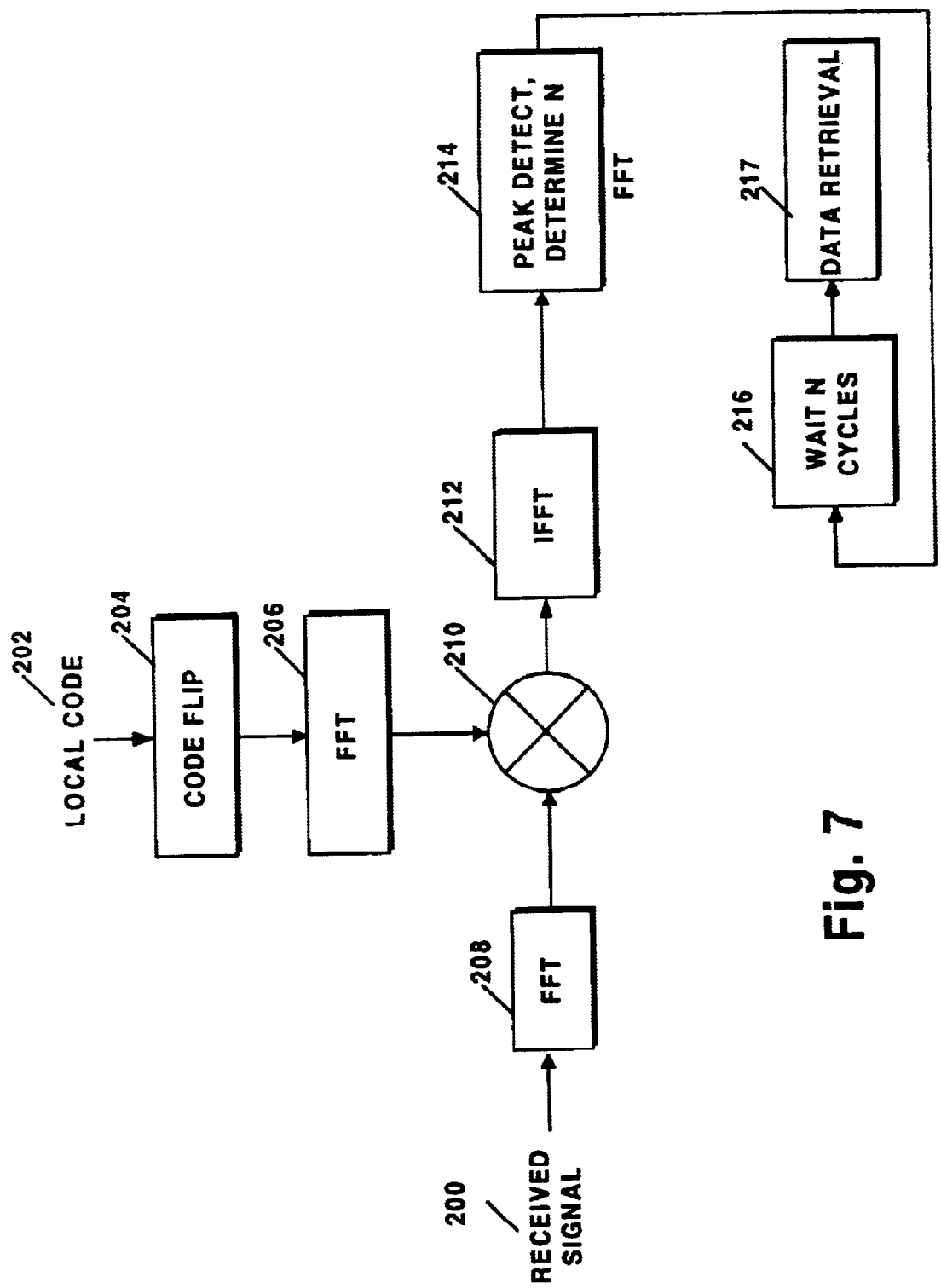
FIG. 7 is a flowchart of an embodiment of a method for detecting received code phase or delay using Fourier transforms.

Referring now to FIG. 7, an embodiment of an algorithm used in synchronizer 108 to detect the phase/delay/shift in the received code in a received signal 200 compared to a local reference code signal 202 is shown. A synchronizer 108 constructed in accordance with the teaching of the invention as shown in FIG. 7 includes a code reverser 204, a first transformer 206, a second transformer 208, a multiplier 210, an inverse transformer 212, a peak detector 214, and a timing controller 216. The synchronizer 108 then provides output from the timing controller 216 to a data retrieval component 217 which is not part of the synchronizer 108. In one embodiment, the synchronizer 108 uses a digital data processor.

In one embodiment, the synchronizer 108 uses transforms, such as Fast Fourier Transforms (FFT) to process the received signal 200 and the local reference code signal 202. The code reverser 204 receives the local reference code signal 202 as input and perform a code flip or bit reverse on the reference code signal 202. In a code of n length, the code reverser 204 makes the last chip (or bit) the first chip, and the next to the last chip the second chip, and so on. A chip is defined as a period associated with one value in the code. More specifically, a chip is a period of a code clock or the output of a code generator during one clock interval. In one embodiment, one chip is regarded as having one bit. Typically, the code signal is treated as a sequence of bits, and the code reverser 204 reverses the order of the bits in the sequence. For example, if the code is 7 bits, 111 01 00, then the reversed code is 00 10 111. The code reverser 204 thus produces a reversed code signal as output, which is received by the first transformer 206 as input. In one embodiment, this process is performed using a digital data processor. In other embodiments, the synchronizer is implemented as an ASIC integrated chip or other hardware device, or as a software program or application. Alternatively, the synchronizer is implemented as either a digital device or as an analog device, depending on which is optimal in a given situation. In one embodiment, the digital approach is used because it provides faster synchronization.

The first transformer 206 transforms the reversed code signal using an FFT or other transform to obtain the frequency spectrum for the reversed code signal, and provides a transformed reversed code signal as output. In one embodiment, the first transformer 206 may produce the reversed code before processing an incoming received signal. If done beforehand, the reversed code signal is stored in a local digital memory associated with the synchronizer 108. In other embodiment, other transforms than a FFT transform may be used. Any transform may be used that outputs the position in time of the peak of the correlation function when the transform is combined with other operations.

The second transformer 208 receives the received signal 200 as input and transforms the received signal with an FFT or other transform to produce a transformed received signal as output. For example, in one embodiment, the second transformer 208 samples the received signal once every chip cycle, thus producing one bit per chip. For a 3-bit code, the second transformer 208 takes seven samples and creates a 7 point FFT. Preferably the second transformer 208 adjusts the sample to be a power of 2 to use a faster FFT algorithm. For example, if taking a 7-bit sample, the sample is padded with a value of 0 to obtain a sample of 8. In another embodiment, a Fourier transform is not used, and the synchronizer is implemented by repeatedly shifting the local code in a sample and compute approach, as will be discussed later.

The multiplier 210 receives as input the transformed reversed code signal from the first transformer 206 and the transformed received signal from the second transformer 208. In the frequency domain, the multiplier 210 multiplies the transformed reversed signal and the transformed received signal to produce an intermediate signal as output. This operation is equivalent to a convolution operation in time.

The inverse transformer 212 receives the intermediate signal as input from the multiplier 210 and performs an inverse FFT on the intermediate signal to produce a correlation signal as output. The correlation signal is used as a correlation function for all of the different shifts that are possible. The peak detector 214 receives the correlation signal as input from the inverse transformer 212 and determines a peak value in the correlation signal. The correlation signal has a low value at all points that do not represent the shift value. In effect, if out of phase, the values of the reference code signal and the received signal do not match, and a low value results. When the values of the two signals match, then a large positive value is obtained. At the point of the shift value, the correlation has a peak value indicating the shift value N.

A timing controller or timing routine 216 receives a synchronization value N from the peak detector 214. In one embodiment, N indicates the number of chips to wait while receiving the received signal 200 until the embedded code in the received signal 200 is in phase with the local code 202. During the waiting period the synchronizer 108 does not process the incoming received signal 200. Then other data retrieval components 217 outside of the synchronizer 108 such as the information processor 112 begin to retrieve the supplementary data embedded in the received signal 200.

In one embodiment, an example of the timing process to achieve synchronization is as follows: The length of the pseudorandom code is known or determined. The synchronizer 108 samples the received signal 200 for one or more lengths of the code. In one embodiment, if the code is a 1023 chips and each chip is two pixels, then the synchronizer 108 may sample two code lengths or 4092 pixels. The correlation is then processed, using a digital processor, in the time it takes in one embodiment for about 200 more pixels of the received signal 200 to arrive. The synchronizer 108 determines, for example, that the embedded code in the received signal 200 is out of phase with the local code 202 by a time period equivalent to 1000 pixels. The synchronizer 108 determines that it must wait another 800 pixels for the embedded code in the received signal 200 to be in phase with the local code 202, because a time period equal to 200 pixels has already elapsed while the synchronizer 108 was determining the phase difference.

The advantage of the FFT approach to synchronization, as shown in FIG. 7, is a reduction of operations required when long codes are involved. The FFT approach may require NlogN operations to achieve synchronization, whereas the sample and compute correlation, discussed for FIG. 8, may require N squared operations. In another embodiment, the sample and compute approach discussed for FIG. 8 is used because it does not require the use of complex number and floating point operations required by the FFT approach.

This process is capable of providing synchronization in one transmission period providing one instance of the code, but more than one period may be required. Typically, no more than two or three transmission periods are required.

Figure 8:
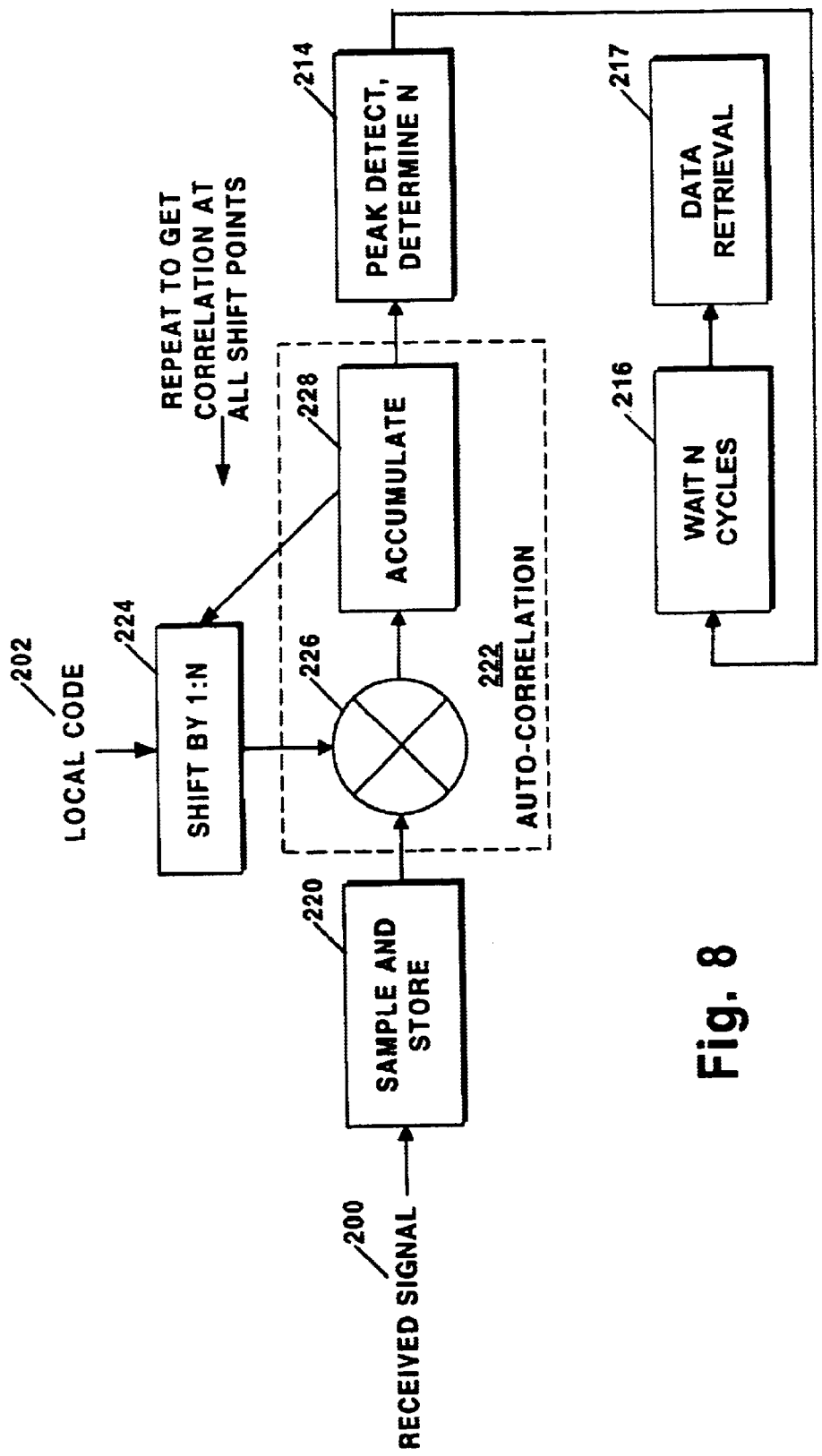
FIG. 8 is a flowchart of another embodiment of a method for detecting received code phase or delay using a sample and compute approach.

In another embodiment of the invention, the synchronizer 108 uses the sample and compute approach to detect the phase/delay/shift in the received code using an off-line phase detect method without using a FFT in the correlation phase (see FIG. 8). In this approach, a digital processor samples one period of n bits. The digital processor processes the sample off line during the transmission cycle, as opposed to the approach used by an on-line analog processor. The synchronizer 108 shifts the reference code signal 202 and performs the correlation process off-line. For example, assume that the sample is seven chips (bits), which are stored in a digital memory associated with the digital processor. The local reference code is also stored in memory, and a reference code signal 202 is produced as needed from the stored reference code in memory. In an off line process, the local reference code signal 202 is shifted once and correlated with the sample from the received code 200 in a correlation cycle. This process is repeated, up to seven times, to find a maximum value above a certain threshold. When the maximum value is found, the amount the local reference code signal 202 is shifted during that correlation cycle indicates the value N that is the value of shifts required to synchronize the received signal 200 and the reference code signal 202. This value N is then used to determine a delay period to wait for the received signal 200 to come into phase with the local reference code signal 202.

FIG. 8 shows an embodiment of the off-line sample and compute approach used to detect the phase/delay/shift in the embedded signal in the received signal 200. A synchronizer 108 constructed in accordance with the teaching of the invention as shown in FIG. 8 includes a signal sampler 220, an autocorrelation circuit 222, a code shifter 224, a peak detector 214, and a timing controller 216. The synchronizer 108 provides output from the timing controller 216 to a data retrieval component 217, which is not part of the synchronizer 108. The autocorrelation circuit 222 includes a multiplier 226 and an accumulator 228.

The sampler 220 samples receives the received signal 200 as input and samples the received signal 200 to acquire one or more code periods of the pseudorandom code and stores the sample in memory. The sampler 220 produces a sample signal as output, which serves as input to the autocorrelation circuit 222. The autocorrelation circuit 222 also receives as input the local reference code signal 202, which may be shifted by one or more increments of a shift or wait value N, which is used to determine how many increments the local reference code 202 is out of phase with the code embedded in the received signal 200. In one embodiment, each increment of N is a chip, assuming each chip corresponds to one bit of the pseudorandom code 202. Thus, the code shifter 224 shifts the local code 202 by one or more increments before providing the shifted code as input to the autocorrelation circuit 222. The multiplier 226 receives as input the code 202 from the code shifter 224 and the sample signal from the sampler 220 and produces an intermediate signal as output to the accumulator 228. The code shifter 224 shifts the local code 202 repeatedly and provides the shifted code as new input to the autocorrelation circuit 222. The multiplier 226 multiplies the sampled code and the shifted code in repeated steps, as the shifter 224 shifts the code 202 by different increments of N. The results are accumulated in the accumulator 228. The process is repeated to obtain correlation at all shift points. The accumulator 228 provides an output correlation signal to the peak detector 214. The peak detector 214 receives the correlation signal from the autocorrelation circuit 222 and determines a peak value in the correlation signal. This peak value indicates a shift or wait value N that can be used to synchronize the embedded code in the received signal 200 and the local code 202.

As described previously for FIG. 7, a timing controller 216 waits a time period indicated by N so that the received signal 200 comes into phase with the local code 202. Then a data retrieval component 217, which is not part of the synchronizer 108, can retrieve the supplementary data from the received signal 200.

The methods described above for FIGS. 7 and 8 substantially synchronize the embedded code in the received signal 200 with the local reference code 202 to an accuracy of one chip. However, after synchronization has been achieved, the alignment between the embedded code and local reference code 202 may shift or drift over time within one chip, especially if the transmitter and/or receiver is moving in space. In one embodiment, a phase detector circuit is used to detect any drift of the phase alignment and to track the received signal and maintain a lock on it.

In another embodiment, the synchronizer 108 is implemented using an analog approach. In this approach, the synchronizer 108 makes one correlation pass, compares the correlation signal to a predetermined threshold value to determine if synchronization has been reached. If correlation has not been reached, the synchronizer 108 waits one chip and repeats the process. When the comparison exceeds a predetermined threshold value, then the synchronizer 108 stops waiting, because synchronization has been achieved.

Referring now to the SNR used for embedded supplementary data, the data is used to moderate a spread spectrum signal based at a particular SNR. As the SNR increases in size and the supplementary data decreases in size over FIGS. 9a–9d, the supplementary data may still be recovered.

FIGS. 9a–9d depict the embedded supplementary data, referred to generally as 250 in a sent signal, and the recovered data, referred to generally as 252 and 254 from the received signal, for different SNR levels for one embodiment of the invention. The recovered data signals 252, 254 include the comparator or correlator output 252 and integrate and dump output 254. The recovered data signals 252, 254 are shown in the lower charts, referred to generally as 260, of FIGS. 9a–9d. The supplementary data signal 250 is shown in the upper charts, referred to generally as 258, of FIGS. 9a–9d. The horizontal axes, referred to generally as 266 and 268, in FIGS. 9a–9d show the chip count, which indicates the number of chips, or bits, of the pseudorandom code that has been received or processed in each signal The vertical axes, referred to generally as 262 and 264, in FIGS. 9a–9d, show the strength of the signals. The vertical axis 262 in the upper graphs 258 in FIGS. 9a–9d shows the size of the supplementary data signal 250. The vertical axis 264 in the lower graphs 260 in FIGS. 9a–9d shows the size of the recovered data signals 252, 254. In one embodiment, the units for the vertical axes 262, 264 are in volts. The recovered data signals 252, 254 are larger than the supplementary data signal due to a process gain due to the accumulation of many chips of the received signal 200 during the correlation process.

Figure 9A:
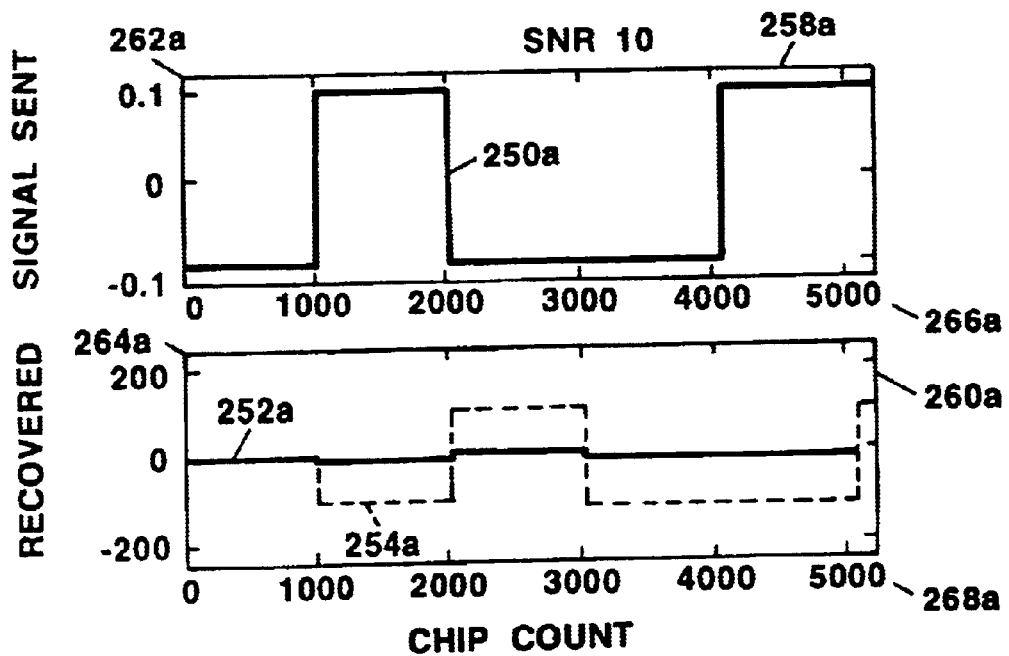
FIGS. 9a–9d are graphs of one embodiment of the invention showing embedded data signals in received signals and recovered data signals for different signal to noise ratios.
Figure 9B:
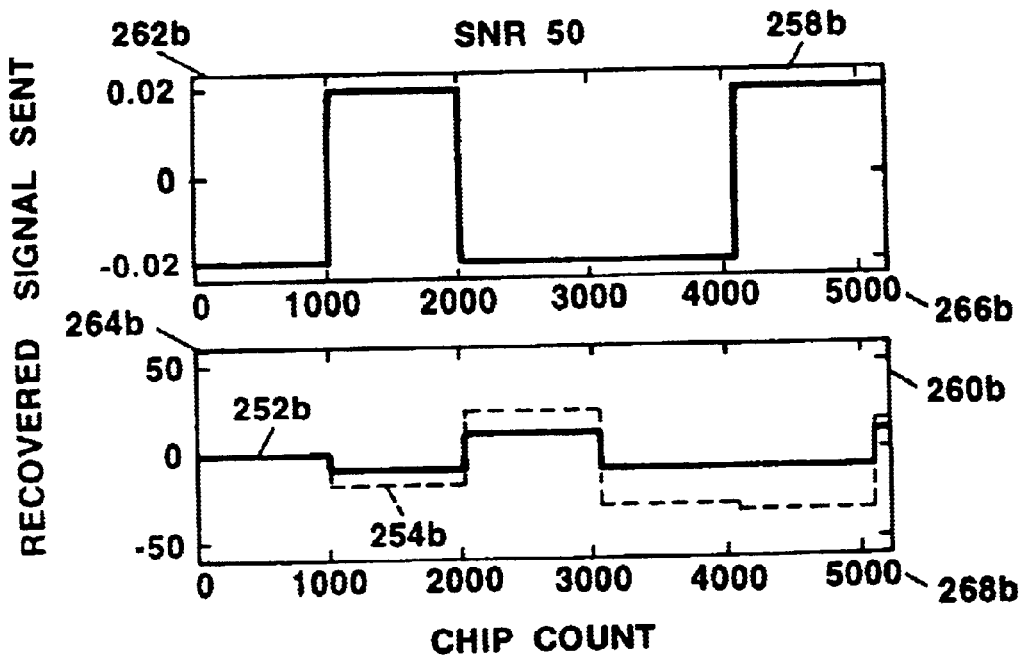
Figure 9C:
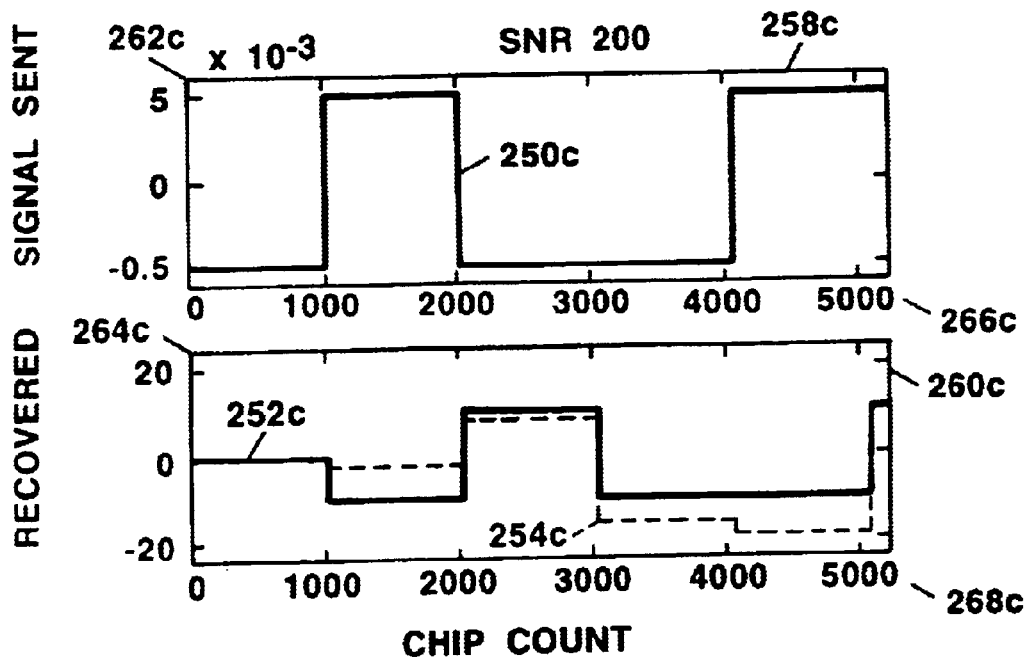
Figure 9D:
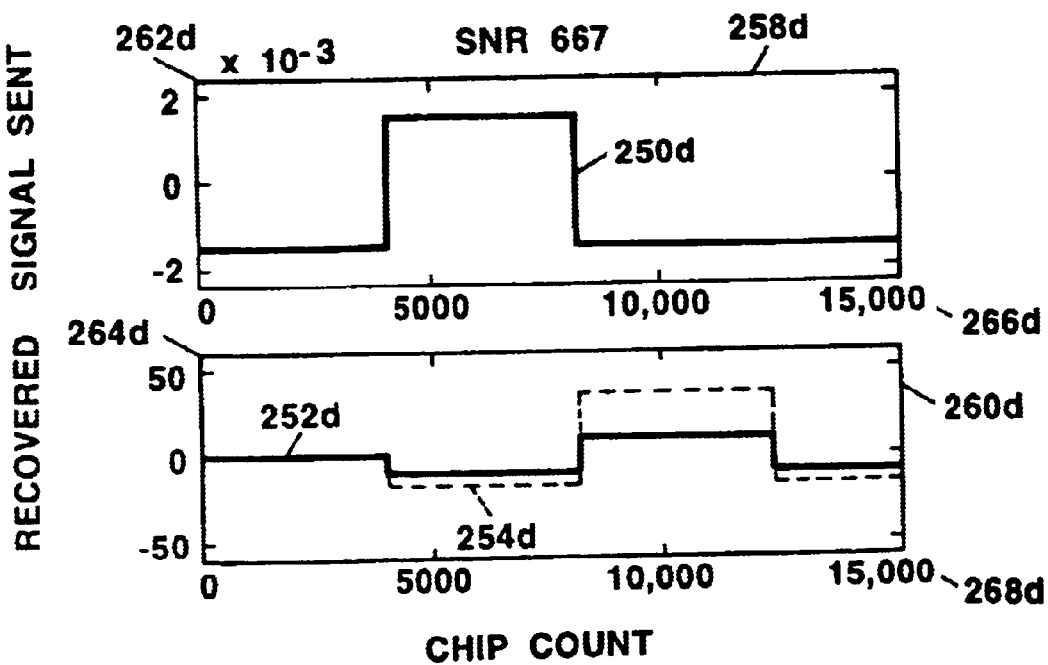

In FIGS. 9a–9c, one bit of supplementary data equals about 1000 chips. In one embodiment, the one bit of supplementary data is equal to one period of a 1023-bit pseudorandom code. Thus, for FIGS. 9a–9c, about four bits of supplementary data is shown in each figure. In FIGS. 9a–9c, the recovered signals 252a, 252b, 252c, and 254a, 254b, 254c lag about 1000 chips behind the sent signal 250a, 250b, 250c. In FIG. 9d, one bit of supplementary data is equal to about 4000 chips. The recovered signal 252d, 254d lags about 4000 chips behind the sent signal 250d. The recovered signals 252, 254 lag behind the sent signal 250, because the correlation process, such as the autocorrelation circuit 222, typically accumulates the supplementary data signal over one code period (typically 1000 chips) and then determines if the accumulated value indicates a value of 1 or 0 for the bit of supplementary data. Then the recovered signals 252, 254 reflect the bit value determined from the correlation process.

Thus in FIG. 9a, the SNR is 10, and the size of the supplementary data signal 250a is 0.1. In FIG. 9b the SNR is 50, and the size of the supplementary data signal 250b is 0.02. In FIG. 9c, the SNR is 200, and the size of the supplementary data signal 250c is 0.005. In FIG. 9d, the SNR is 667 and the size of the supplementary data signal 250d is about 0.002. As indicated in FIGS. 9a–9c, the recovered data signal 252, 254 decreases in size with the increasing SNR ration. Thus in FIG. 9a, the recovered data signals 252a, 254a is based on a scale of positive 200 to negative 200 on the vertical axis 264a of graph 260a. In FIG. 9b, the SNR has increased to a value of 50 and the scale of the recovered data signals 252b, 254b has decreased to a scale of positive 50 to negative 50 on the vertical axis 264b in graph 260b. In FIG. 9c, the SNR has increased to a value of 200, and the scale of the recovered data signals 252c, 254c has decreased to a scale of positive 20 to negative 20 on the vertical axis of 264c of graph 260c. FIG. 9d is not strictly comparable to FIGS. 9a–9c because one bit is equal to a chip count of about 4000 in FIG. 9d, whereas one bit is equal to a chip count of about 1000 in FIGS. 9a–9c. The scale for the recovered data signals 252d, 254d is from positive 50 to negative 50 on the vertical axis 264d of graph 260d.

Having described the preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. An electronic method, comprising the steps of:
   using a spread spectrum demodulator to recover encoded signals from an electronic signal derived from an audio signal sounded on a speaker;
   recording information derived from the recovered encoded signals at different points in time to generate a record of the audio signals which have been sounded in association with a user at said different points in time; and
   using this recorded information to determine what TV or radio programming the user is watching or listening to and to build a record of the user's preference for television or radio programming.

\* \* \* \* \*